US009654852B2

(12) United States Patent
Yin et al.

(10) Patent No.: US 9,654,852 B2
(45) Date of Patent: May 16, 2017

(54) SCALABLE HYBRID PACKET/CIRCUIT SWITCHING NETWORK ARCHITECTURE

(71) Applicant: NEC Laboratories America, Inc., Princeton, NJ (US)

(72) Inventors: Yawei Yin, Plainsboro, NJ (US); Konstantinos Kanonakis, New Brunswick, NJ (US); Ankitkumar Patel, Monmouth Junction, NJ (US); Philip Ji, Cranbury, NJ (US); Junqiang Hu, Davis, CA (US)

(73) Assignee: NEC Corporation, Tokyo (JP)

( * ) Notice: Subject to any disclaimer, the term of this patent is extended or adjusted under 35 U.S.C. 154(b) by 221 days.

(21) Appl. No.: 14/567,760

(22) Filed: Dec. 11, 2014

(65) Prior Publication Data
US 2015/0181317 A1 Jun. 25, 2015

Related U.S. Application Data

(60) Provisional application No. 61/920,592, filed on Dec. 24, 2013.

(51) Int. Cl.
*H04J 14/00* (2006.01)
*H04Q 11/00* (2006.01)
(Continued)

(52) U.S. Cl.
CPC ...... *H04Q 11/0062* (2013.01); *H04J 14/0204* (2013.01); *H04J 14/0205* (2013.01);
(Continued)

(58) Field of Classification Search
CPC ............... H04J 14/0204; H04J 14/0205; H04J 14/0212; H04J 14/0217; H04J 14/0227;
(Continued)

(56) References Cited

U.S. PATENT DOCUMENTS 7,613,177 B1 * 11/2009 Lu ........................... H04L 49/45
370/360
9,225,454 B1 * 12/2015 Liu ........................ H04J 14/02
(Continued)

OTHER PUBLICATIONS

Rahman et al; A Hybrid Network Architecture for Data Centers; 2015; IEEE first International conference for Big Data Computing Service and Applications; pp. 7-13.*
(Continued)

*Primary Examiner* — Ken N Vanderpuye
*Assistant Examiner* — Amritbir Sandhu
(74) *Attorney, Agent, or Firm* — Joseph Kolodka

(57) ABSTRACT

Systems and methods for packet switching in a network, including two or more hybrid packet/circuit switching network architectures configured to connect two or more core level switches in the network architectures, the network architectures being controlled and managed using a centralized software defined network (SDN) control plane. An optical ring network may be configured to interconnect the two or more hybrid network architectures, and one or more hybrid electrical/optical packet/circuit switches configured to perform switching and traffic aggregation. One or more high-speed optical interfaces and one or more low-speed electrical/optical interfaces may be configured to transmit data.

18 Claims, 6 Drawing Sheets

(51) Int. Cl.
*H04J 14/02* (2006.01)
*H04L 12/931* (2013.01)

(52) U.S. Cl.
CPC ...... *H04J 14/0212* (2013.01); *H04J 14/0217* (2013.01); *H04J 14/0227* (2013.01); *H04J 14/0283* (2013.01); *H04J 14/0286* (2013.01); *H04L 49/356* (2013.01); *H04L 49/45* (2013.01); *H04Q 11/00* (2013.01); *H04Q 2011/0092* (2013.01)

(58) Field of Classification Search
CPC ... H04J 14/0283; H04J 14/0286; H04L 49/45; H04Q 11/0062; H04Q 2011/0092
See application file for complete search history.

(56) References Cited

U.S. PATENT DOCUMENTS

| | | | | |
|---|---|---|---|---|
| 9,332,324 | B2* | 5/2016 | Xu | H04Q 11/0005 |
| 9,363,208 | B1* | 6/2016 | Judge | H04L 49/15 |
| 2011/0103391 | A1* | 5/2011 | Davis | H04L 45/60 370/400 |
| 2011/0103799 | A1 | 5/2011 | Shacham et al. | |
| 2012/0008944 | A1* | 1/2012 | Singla | H04J 14/0204 398/45 |
| 2012/0099863 | A1* | 4/2012 | Xu | H04Q 11/0005 398/49 |
| 2012/0213517 | A1* | 8/2012 | Ji | H04J 14/0212 398/48 |
| 2012/0213523 | A1* | 8/2012 | Ji | H04J 14/0212 398/83 |
| 2012/0250679 | A1* | 10/2012 | Judge | H04L 49/351 370/359 |
| 2012/0297042 | A1* | 11/2012 | Davis | H04L 45/60 709/223 |
| 2012/0321310 | A1* | 12/2012 | Spock | H04J 14/00 398/59 |
| 2013/0011136 | A1* | 1/2013 | Hao | H04Q 11/00 398/45 |
| 2013/0266007 | A1 | 10/2013 | Kumbhare et al. | |
| 2014/0006585 | A1* | 1/2014 | Dunbar | H04L 41/00 709/223 |
| 2014/0029618 | A1* | 1/2014 | Janardhanan | |
| 2014/0092901 | A1* | 4/2014 | Kapadia | H04L 45/745 370/390 |
| 2014/0119728 | A1* | 5/2014 | Zhang | H04J 14/0204 398/48 |
| 2014/0147121 | A1* | 5/2014 | Matsukawa | H04J 14/0204 398/83 |
| 2014/0270761 | A1* | 9/2014 | Xu | H04Q 11/0005 398/45 |
| 2015/0043905 | A1* | 2/2015 | Graves | H04Q 11/0005 398/25 |
| 2015/0063160 | A1* | 3/2015 | Uppunda | H04L 49/356 370/254 |
| 2015/0063807 | A1* | 3/2015 | Simonneau | H04B 10/25 398/59 |
| 2015/0092561 | A1* | 4/2015 | Sigoure | H04L 49/356 370/236 |
| 2015/0104171 | A1* | 4/2015 | Hu | H04Q 11/0066 398/48 |
| 2015/0147060 | A1* | 5/2015 | Patel | H04Q 11/0005 398/48 |
| 2015/0149656 | A1* | 5/2015 | McMurry | H04L 45/00 709/238 |
| 2015/0181317 | A1* | 6/2015 | Yin | H04Q 11/0062 398/45 |
| 2015/0304164 | A1* | 10/2015 | Goetje | H04L 41/0806 370/255 |
| 2015/0312657 | A1* | 10/2015 | Yan | H04Q 11/0005 398/48 |
| 2015/0326502 | A1* | 11/2015 | Namihira | H04L 43/0811 370/401 |
| 2016/0007102 | A1* | 1/2016 | Raza | H04Q 11/0005 398/45 |
| 2016/0013973 | A1* | 1/2016 | Onoue | H04L 41/0896 370/254 |
| 2016/0134954 | A1* | 5/2016 | Yang | H04L 12/6418 398/45 |
| 2016/0285648 | A1* | 9/2016 | Fan | H04L 12/6418 |

OTHER PUBLICATIONS

Imran et al; HOSA: Hybrid optical Switch Architecure for Data Center Networks; 2015; Association for Computing Machinery.*
Fiorani et al; Hybrid Optical Switching for Data Center Networks; Feb. 2014; Journal of Electrical and Computer Engineering.*
http://aws.amazon.com/ec2/, 2014 Amazon Web Services, 6 Pages.
http://hadoop.apache.org/, Last published Nov. 30, 2014, 6 Pages.
Al-Fares, et al. "A Scalable, Commodity Data Center Network Architecture," SIGCOMM, ACM, Aug. 2008, pp. 63-74.
Clos. "A Study of Non-Blocking Switching Networks," The Bell System Technical Journal, Mar. 1953, 32(2), pp. 406-424.
Farrington et. al., "Helios: A Hybrid Electrical/Optical Switch Architecture for Modular Data Center, " SIGCOMM, Aug. 2010, pp. 339-350.
G. Wang et. al., "c-Through: Part-Time Optics in Data Centers," SIGCOMM, Aug. 2010, pp. 327-338.
Farrington, et al., "Optical/Electrical Hybrid Switching for Datacenter Communications," OptoElectronics and Communications Conference, Kyoto, Japan, Jul. 2013, 2 Pages.
Ankitkumar, et al., "Hybrid Electro-Optical Distributed Software-Defined Data Center Architecture", NEC Laboratories America, Inc. Invention Record, Nov. 2013, 8 Pages.

* cited by examiner

SCALABLE HYBRID PACKET/CIRCUIT SWITCHING NETWORK ARCHITECTURE

RELATED APPLICATION INFORMATION

This application claims priority to provisional application Ser. No. 61/920,592, filed on Dec. 24, 2013, incorporated herein by reference.

BACKGROUND

Technical Field

The present invention relates to network architectures, and more particularly, to software defined, scalable, hybrid packet/circuit switching architectures for data centers.

Description of the Related Art

Many data center applications are bandwidth-intensive, and as such, the data center network (DCN) is a limiting factor in the performance of the data center applications. For example, a virtual machine migration application in cloud computing (e.g. Amazon Elastic Compute Cloud (EC2) application) requires a large amount of bandwidth resources for a significant time duration; and The MapReduce applications in a Hadoop system may generate one-to-many, many-to-one and all-to-all communication patterns among servers in the Map phase and Reduce phase. The different types of communication requirements impose challenges to the data center networks, which generally end-up as a significant source of Capital Expenditure (CAPEX) and Operational Expenditure (OPEX) in overall data center construction.

Currently, several different network architectures are employed to handle the heterogeneous communication requirements within a data center. One method for the construction of a large scale DCN is the continuous "scaling up" of the hierarchical tree network, where the leaves of the tree (e.g., the top of the rack (TOR) switches) stay with low-cost commodity switches, while the higher hierarchies of the tree employ more high-end switches. Despite the high cost of the high-end electrical switches, their high line-rate features are generally enabled by high speed serializer/deserializer (SerDes) and parallel high-speed electrical connections. Such connections are limited by distance, Printed Circuit Board (PCB) layout, Input/Output (I/O) port densities and power dispatch, etc. Therefore, the continuous "scaling up" of high-end electrical switches is extremely difficult, if not impossible, from the technical point of view.

Another method currently employed is to "scale out" rather than to "scale up" the DCN, which means the use of commodity switches to build a Fat-Tree network in order to increase the network scalability. The Fat-Tree network is essentially a folded CLOS network which inherits both the benefits and drawbacks of the CLOS network (e.g., an advantage is that the network can be built as a non-blocking switch which scales up to very large port count, and a drawback is that the number of small commodity switches required scales at the same pace with the number of servers the Fat-Tree can support). The advantages of the Fat-Tree network make the large-size DCN technically feasible, but the drawbacks of it still leave the cost of building and operating a relatively large DCN prohibitively high.

SUMMARY

A system for packet switching in a network, including: two or more hybrid packet/circuit switching network architectures configured to connect two or more core level switches in the network architectures, the network architectures being controlled and managed using a centralized software defined network (SDN) control plane; an optical ring network configured to interconnect the two or more hybrid network architectures; one or more hybrid electrical/optical packet/circuit switches configured to perform switching and traffic aggregation; and one or more high-speed optical interfaces and one or more low-speed electrical/optical interfaces configured to transmit data.

A method for packet switching in a network, including connecting two or more core level switches in the network architectures using two or more hybrid packet/circuit switching network architectures, the network architectures being controlled and managed using a centralized software defined network (SDN) control plane; interconnecting the two or more hybrid network architectures using an optical ring network; performing switching and traffic aggregation using one or more hybrid electrical/optical packet/circuit switches; and transmitting data using one or more high-speed optical interfaces and one or more low-speed electrical/optical interfaces.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
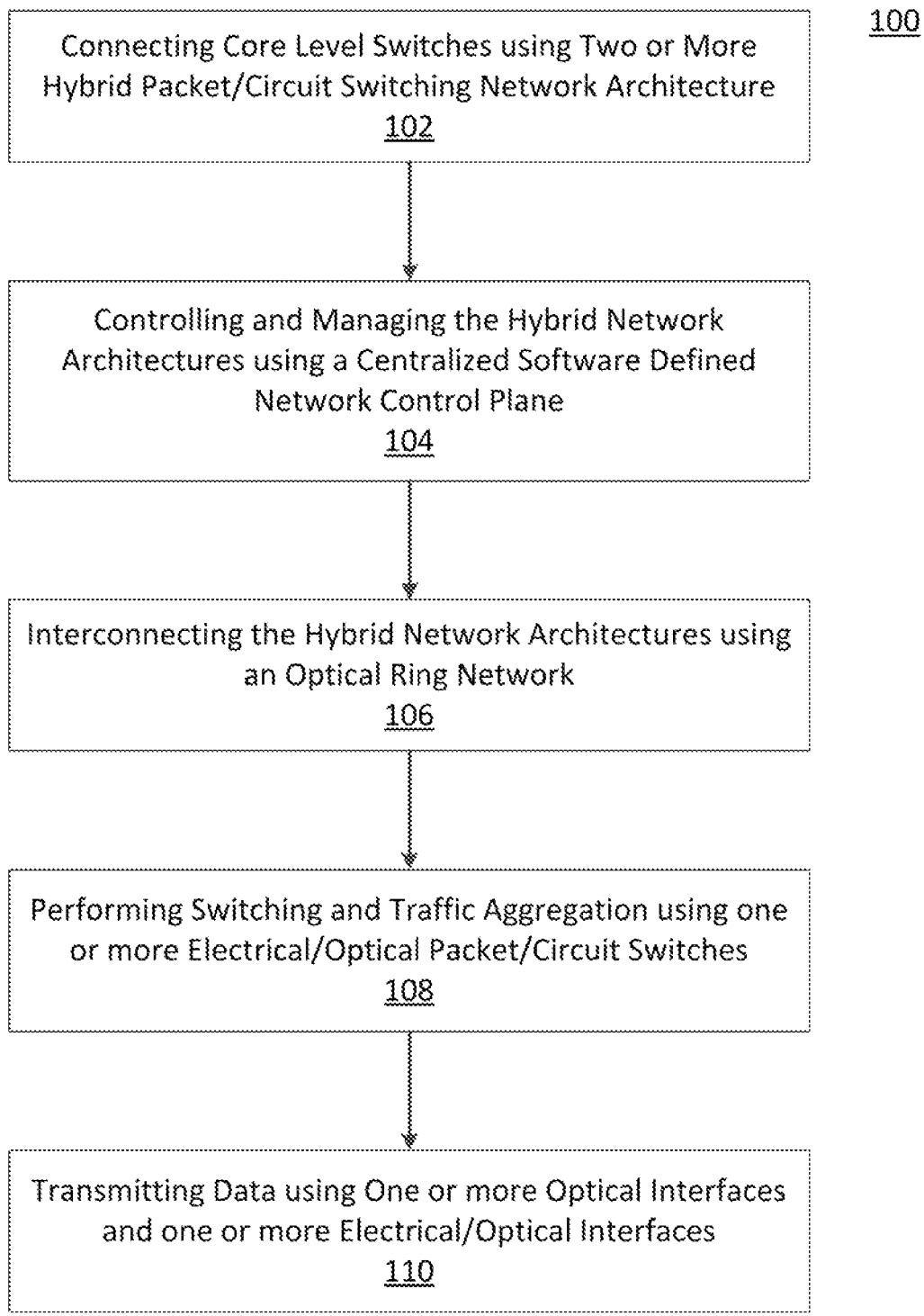
FIG. 1 is a block/flow diagram illustrating a system/method for data transport in a scalable, hybrid packet/circuit switching network for data centers in accordance with the present principles.

In accordance with the present principles, systems and methods are provided for a hybrid electrical-optical switching network architecture that is low-cost, power efficient, scalable to support large scale data centers and/or multiple data centers and provides the software defined network (SDN) control and virtualization functionalities. The system/method according to the present principles may include a hybrid electrical/optical data center network architecture which does not require a high port-count optical switching fabric in a centralized optical switching architecture in DCN. Rather, it may employ small scale optical switches and a Fat-Tree based network for the optical implementation of the hybrid network, and may keep a similar topology for both the electrical packet switching network and its optical counterparts. An optical ring based network may be established at the core layer of the Fat-Tree to extend all-optical reachability.

In one embodiment, the identical mixed electrical/optical switches may be employed at all the layers of the Fat-Tree network. There may be k number of Optical/Electrical (O/E), Electrical Optical (E/O) conversion ports attached to the electrical switching fabric, functioning similarly as the add/drop port in a reconfigurable optical add/drop module (ROADM). These ports may be responsible for aggregating/de-aggregating the electrical traffic from servers, racks and even pods and convert them between the optical domain and electrical domain. In one embodiment, the optical ring networks may connect the corresponding group of core switches and provide hop-by-hop all-optical connectivity to extend the reach of the all-optical paths. The optical ring network is potentially a blocking network that provides a reconfigurable optical bandwidth resource pool.

In one embodiment, the Fat-Tree based hybrid switching network may be implemented in a smaller scale (e.g. a two-layer Fat-Tree), while the all-optical ring network above the core layer of the Fat-Tree can use more complicated topology (e.g., 2D/3D Torus, Flattened Butterfly or mesh network). In one embodiment, so-called "super servers" may be employed to generate or aggregate large traffic volume, and are equipped with long-reach optics to go beyond racks, pods, or even data centers with large bandwidth and server-to-server all-optical connectivity.

In one embodiment, one or more software defined network (SDN) controllers and orchestrators may be employed in the data center network to support the centralized control and the network resource virtualization functionalities. It is noted that network virtualization may include virtualization of both the packet granularity and the circuit granularity bandwidth resources offered by the hybrid electrical/optical data center network.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIG. 1, a block/flow diagram illustrating a system/method for data transport in a scalable, hybrid packet/circuit switching network for data centers in accordance with the present principles is illustratively depicted according to one embodiment of the present principles. In one embodiment, the method for packet switching 100 in a network according to the present principles may include connecting two or more core level switches in the network architectures using two or more hybrid packet/circuit switching network architectures in block 102. The network architectures may be controlled and managed using a centralized software defined network (SDN) control plane in block 104. The two or more hybrid network architectures may be interconnected using an optical ring network in block 106.

Switching and traffic aggregation may be performed using one or more hybrid electrical/optical packet/circuit switches in block 108, and the data may be transmitted using one or more high-speed optical interfaces and one or more low-speed electrical/optical interfaces in block 110. It is noted that the data may also be transmitted using high-speed optical interfaces alone, low-speed electrical/optical interfaces alone, low-speed electrical interfaces, or any combination thereof.

Figure 2:
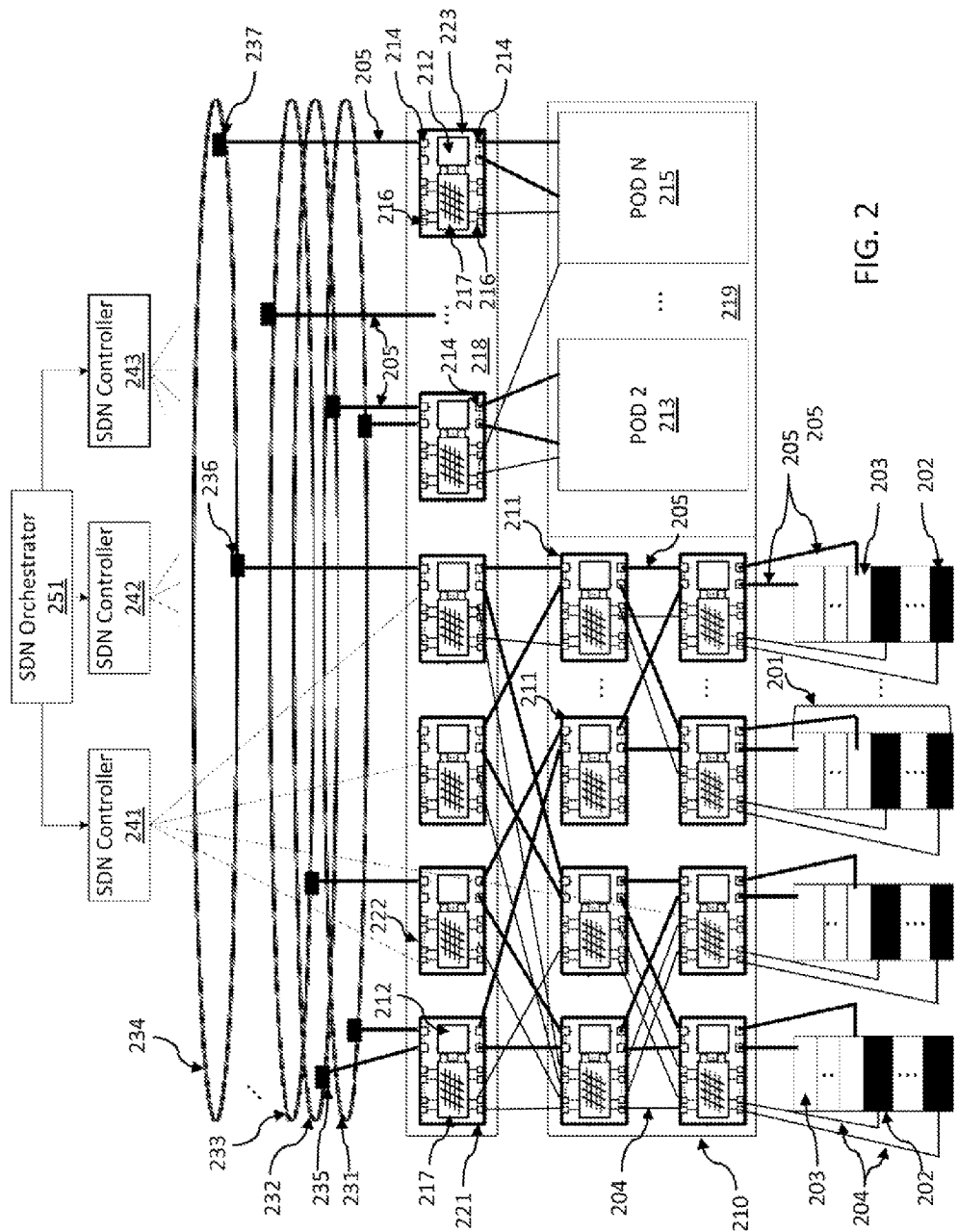
FIG. 2 is a block/flow diagram illustrating a system/method for data transport in a scalable, hybrid packet/circuit switching network for data centers in accordance with the present principles.

Referring now to FIG. 2, a block/flow diagram illustrating a system/method for data transport in a scalable, hybrid packet/circuit switching network for data centers is illustratively depicted according to one embodiment of the present principles. In one embodiment, a hybrid data center network architecture may employ a mixed use of both electrical packet switches and optical circuit switches.

In one embodiment, servers may be organized in one or more racks 201. The number of servers that can be mounted in a rack may be determined by the size of the rack, the power management plan and the number of downward (e.g., switch to server) links that the top-of-rack (TOR) switch can support. As the computing power, storage and I/O speed of the servers are continuously evolving, the servers within data centers may gradually be upgraded. At an intermediate stage of evolution, the servers in one rack may include a mix of both traditional servers 202 and super servers 203. The traditional servers may be equipped with low-speed network interface cards (NIC) that are connected to the TOR switch using either electrical cable or low speed optical cables 204, (e.g., 1 Gigabyte per second (Gb/s) Ethernet cables). The super servers may be equipped with high-speed NIC and are connected to the TOR switch using high-speed optical fiber cables 205 (e.g., 10 Gb/s or 40 Gb/s wavelength division multiplexed (WDM) single mode fibers (SMF)). The super servers may also be equipped with one or more low-speed network interface cards which may be connected to the low-speed network interfaces in the TOR switch.

In one embodiment, the TOR switches 211 may include hybrid electrical/optical switching fabrics and multiple high-speed optical interfaces 214, as well as low-speed electrical/optical interfaces 216. The electrical switching fabric 217 may be implemented using, for example, the crossbar based electrical switching technologies that are used in conventional commodity switches. The optical switching fabric 212 may be implemented using, for instance, Micro-Electro-Mechanical-Systems (MEMS) based technologies as the switching matrix. Both switching fabrics 212, 217 may be controlled using, for example, existing distributed L1 control technologies or a software defined network (SDN) controller 241, 242, 243. However, the SDN based control technology may enhance the network virtualization functionalities.

In one embodiment, without losing generality, the system and method according to the present principles does not restrict the control plane technologies applied to the hybrid network architecture, but employment of an SDN based control plane may be advantageous. The Optical/Electrical/Optical (O/E/O) interfaces connecting the electrical switching fabric 217 and the optical switching fabric 212 may be simply pluggable modules (e.g., Small Form-Factor Pluggable (SFP), SFP+, 10 Gigabit Small Form-Factor Pluggable (XFP), 100 Gigabit Form-Factor Pluggable (CFP), etc.) or special-purpose O/E/O converters. The number of such O/E/O interfaces is not restricted, and it may be determined based on a variety of factors, including, for example, the budget, the fanout constraint, and the traffic aggregation/de-aggregation requirements.

The number of upward (e.g., connected to the aggregation layer 219) interfaces, including both the electrical and optical interfaces, can be equal to or less than the number of downward (connected to the servers) interfaces depending on the oversubscription ratio in the Fat-Tree design. In one embodiment, the oversubscription may be 1:1, and there may be an equal number of interfaces upward and downward.

In one embodiment, as in the traditional Fat-Tree based data center network, the aggregation switches interconnecting the TOR switches 211 in the second tier of the Fat-Tree follow the same low-cost design as the TOR. It is noted that the switches in all the layers of the Fat-Tree network may follow the same design, as the switch 212 and 221 shows in FIG. 2. In one embodiment, assuming that all the switches with the identical architecture have N electrical ports and M optical ports (excluding the K O/E/O conversion ports connecting the electrical fabric to the optical fabric internally), if N>M, then there may be N/2 TOR switches and N/2 aggregation switches in one pod of clusters 210.

In one embodiment, using a modular data center design, one pod of clusters 210 may be the second hierarchy of server groups which generally includes several rows and columns of racks. One pod may be considered as a mini-data-center. The N/2 TOR switches and N/2 aggregation switches in one pod may be connected in a full-mesh topology using $(N/2)^2$ low-speed electrical/optical wires 204. The interconnection pattern is shown in FIG. 2 as 210. Note that the interconnection pattern may be drawn in an illustrative fashion assuming that N=4 and M=2, but it does not restrict the integer number N and M to be any reasonable value. Furthermore, the optical parts of each hybrid switch 211, 212 may also be connected in a full-mesh topology. Given the assumption that N>M, not all the N/2 hybrid switches may be connected using the high-speed optical fiber cables 205 in one full-mesh network. Therefore, the all-optical full-mesh network may be separated in different parts.

For Example, in one embodiment, in Pod 1 210 in FIG. 2, M may be assumed to be 2, and therefore there can be two all-optical full-mesh networks in POD 1 210. In one reasonable design of the hybrid data center network, N may be expected to be higher than M. However, the present principles do not restrict the ratio of N/M. If N<M, then there can be M/2 TOR switches and M/2 aggregation switches in one pod interconnected by $(M/2)^2$ high-speed optical fiber cables 205 in a full-mesh network, while the electrical full-mesh network may be separated into different sub networks.

In one embodiment, similarly to the conventional Fat-Tree network, the second-layer aggregation switches may be interconnected through the third-layer (core layer) switches 221. The core-layer switches 221 may follow the same design as the TOR switches 211 and the aggregation switches 212. If there is no $4^{th}$-layer of switches in the Fat-Tree, the 3-layer switches may use all of their electrical ports to interconnect the $2^{nd}$ layer switches. Therefore, the electrical part of the network may follow the same topology as the conventional Fat-Tree. As for the all-optical part of the network, in the three-layer Fat-Tree, if N=M, then the optical network topology may be the same as the electrical network. If N<M, then the optical network can be constructed as a single (e.g., big) Fat-Tree, while the electrical network may be segmented into different (e.g., small) Fat-Trees. If N>M, as illustrated in FIG. 2, the optical network may be segmented into different (e.g., small) Fat-Trees which may be embedded in the single (e.g., big) Fat-Tree.

It is noted that the interconnection pattern drawn in FIG. 2 is an illustrative example, and is assuming that N=4 and M=2, but there is no restriction of the value of the positive integer number N and M. In the case of N>M, the $4^{th}$ layer of optical ring networks can be constructed to interconnect the segmented (e.g., small) optical Fat-Tree networks. In one embodiment, the high-speed optical interfaces may be connected to one or more optical rings 231, 232, 233, 234 through optical add/drop modules 235, 236, 237. The optical fiber rings may be single lambda ring networks, wavelength division multiplexing (WDM) rings. The former are blocking networks while the latter can be configured as non-blocking cross-bars if a sufficient number of wavelengths may be used. The detailed architecture of the optical add/drop modules will be discussed in more detail hereinbelow.

In one embodiment, the present principles may employ software defined network (SDN) control plane technology to control, abstract and virtualize the underlying data plane resources in the hybrid packet/circuit switching network. In such cases, the switches may be SDN capable. The SDN controllers 241, 242, 243 may be responsible for controlling the hybrid switching fabric at all the layers in the Fat-Tree network. They may be responsible for monitoring the switch status, compute the routing path, setup/modify/delete the flow tables and/or optical cross-connections, etc. The SDN controllers may also be responsible for providing the north bound interfaces to one or more SDN orchestrators 251 and/or other control/management plane applications.

The one or more SDN orchestrators 251 may be responsible for orchestrating different controllers within a data center or even between data centers. It is noted that although the present invention advocates the use of the SDN control plane technologies for the hybrid data center network, and a main focus of the present principles involves the hybrid packet/circuit switching network architecture, the present principles do not restrict the type of control plane technologies used in the hybrid data center network.

In one embodiment, at the core layer 218, the core switches 221, 222, 223 may be grouped into different small optical Fat-Trees (assuming N>M). In each optical Fat-Tree (assuming there are in total j number of optical ports from all of the optical switching fabrics in that group that will be connected to the optical ring layer), then each of the j ports may be connected to a separate optical ring through one or more optical add/drop modules 235, 236, 237. For example, the $i^{th}$ optical port (1<i<j) of group 1 may be connected to the $i^{th}$ optical port of group 2, 3, 4, etc. in the same optical ring, while the optical ports in the same group may not be connected to each other through the upper layer optical rings. Therefore, there may be j number of optical rings above the core layer in the network architecture according to the present principles.

It is noted that the one or more optical add/drop modules 235, 236, 237 in the hybrid data center network may have different designs, and FIGS. 3-6 are examples of several different solutions for the optical add/drop modules according to the present principles. It is noted that the optical add/drop modules employed according to the present principles are not limited only to those illustratively depicted in FIGS. 3-6, and that other sorts of add/drop modules may also be employed according to the present principles.

Figure 3:
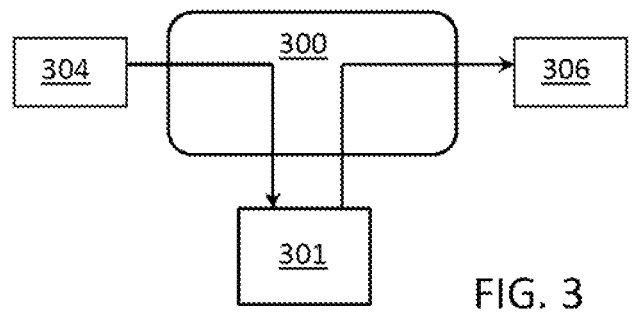
FIG. 3 is a block/flow diagram illustrating a system/method for data transport including an optical add/drop module in accordance with the present principles.

Referring now to FIG. 3, with continued reference to FIG. 2, a block/flow diagram illustrating a system/method for data transport including an optical add/drop module 300 is illustratively depicted according to one embodiment of the present principles. In this embodiment, the optical add/drop module may be one pair of fibers connecting both the input 304 and output 306 of one port 301 of an optical switching fabric in one or more hybrid packet/circuit switches (e.g., 221, 222, 223 in FIG. 2). The optical switching fabric may then either switch the incoming optical signals to the underlying Fat-Tree network (in which case drop the signals and add new signals to the optical ring) or simply loopback the signals on this port 301 (in which case bypassing the signals to the next hop).

Figure 4:
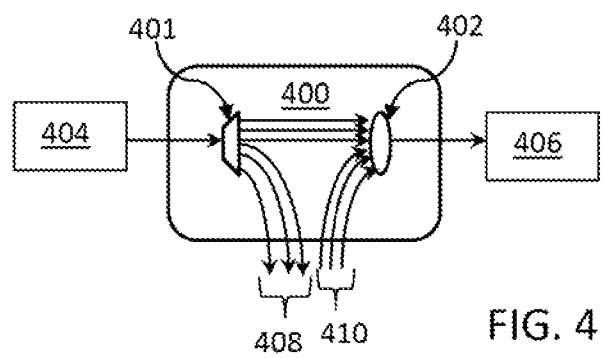
FIG. 4 is a block/flow diagram illustrating a system/method for data transport including an optical add/drop module in accordance with the present principles.

Referring now to FIG. 4, block/flow diagram illustrating a system/method for data transport including an optical add/drop module 400 is illustratively depicted according to one embodiment of the present principles. In this embodiment, it may be assumed that each optical Fat-Tree (e.g., one node in the optical ring) may be receiving signals as input 404 at a fixed wavelength set and transmitting signals to different nodes in the optical ring using tunable transmitters. In other words, each node in the optical ring may have a "wavelength address", and whichever node needs to send signals to a particular node can tune its transmitter to the particular wavelength. In this assumption, the optical add/drop modules may include a Wavelength Division Multiplexed (WDM) demultiplexer (DEMUX) 401 which may drop particular wavelengths 408 to each node, and a power coupler 402 which may couple the added signals 410 to an optical ring.

Figure 5:
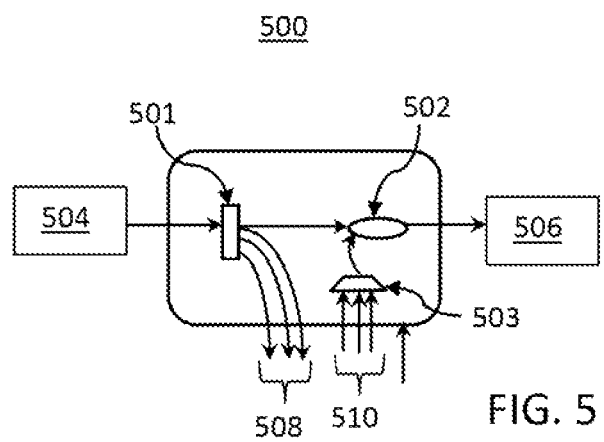
FIG. 5 is a block/flow diagram illustrating a system/method for data transport including an optical add/drop module in accordance with the present principles.

Referring now to FIG. 5, block/flow diagram illustrating a system/method for data transport including an optical add/drop module 500 is illustratively depicted according to one embodiment of the present principles. In this embodiment, each optical Fat-Tree (e.g., one node in the optical ring) may input 504 and transmit signals at fixed wavelengths and receive signals at different wavelengths according to the source node's wavelength assignment as output signals 506. In this case, the optical add/drop module 500 may include one or more wavelength selective switches (WSS) 501, which may drop particular wavelengths 508 that the current node wants, and may bypasses the remaining wavelengths to the downstream of the optical ring. One or more optical couplers 502 and one or more multiplexers (MUX) 503 may couple the transmitted signals 510 to an optical ring. Since the node may transmitting at fixed wavelengths, the MUX and the coupler may all be passive components according to one embodiment of the present principles.

Figure 6:
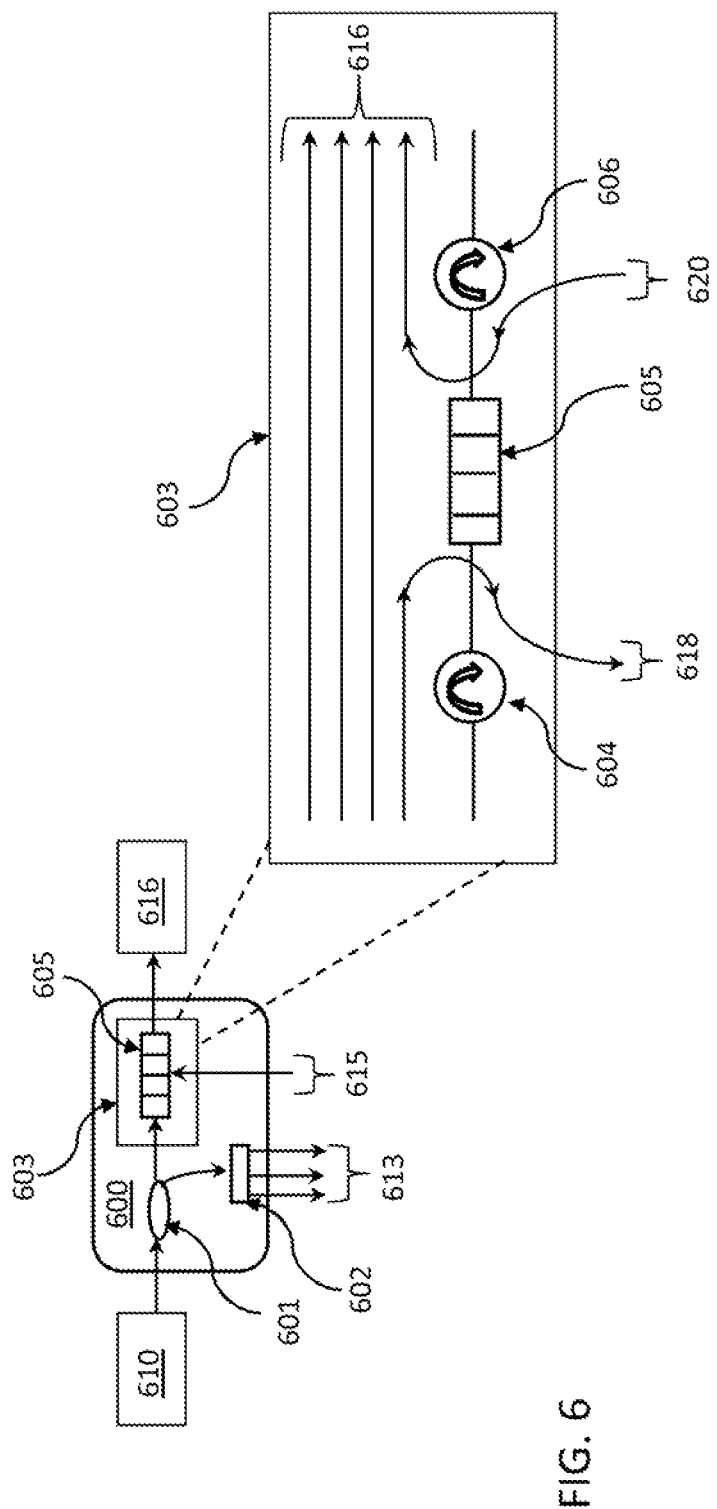
FIG. 6 is a block/flow diagram illustrating a system/method for data transport including an optical add/drop module in accordance with the present principles.

Referring now to FIG. 6, block/flow diagram illustrating a system/method for data transport including an optical add/drop module 600 is illustratively depicted according to one embodiment of the present principles. In this embodiment, the module 600 may receive input 610, and may employ one or more optical splitters 601 to tap off a portion of the optical power (including all wavelengths) from the ring, and may employ one or more Wavelength Selective Switches (WSS) 602 (e.g., 1×N) to drop the wanted wavelengths 613. The remaining power may travel toward one or more fiber Bragg grating (FBG) modules 603, which may include one or more input circulators 604, one or more FBG reflectors 605, and one or more output circulators 606. The FBG module 603 may drop the wavelengths that will be transmitted as output 616 at the current node in order to remove possible interference. Since each node is transmitting at fixed wavelengths in this assumption, the FBP module 603 may employ specifically designed passive components. It is noted that a difference between the optical add/drop module 600 and 500 (in FIG. 5) is that the module 600 only taps off one portion of the optical power from the ring, and as such, can support multicasting capabilities which can bypass the same signal to all the downstream nodes simultaneously. Such multicasting capabilities are useful in a variety of applications (e.g., video streaming to multiple users, Message Passing to multiple computing process, etc).

Figure 7:
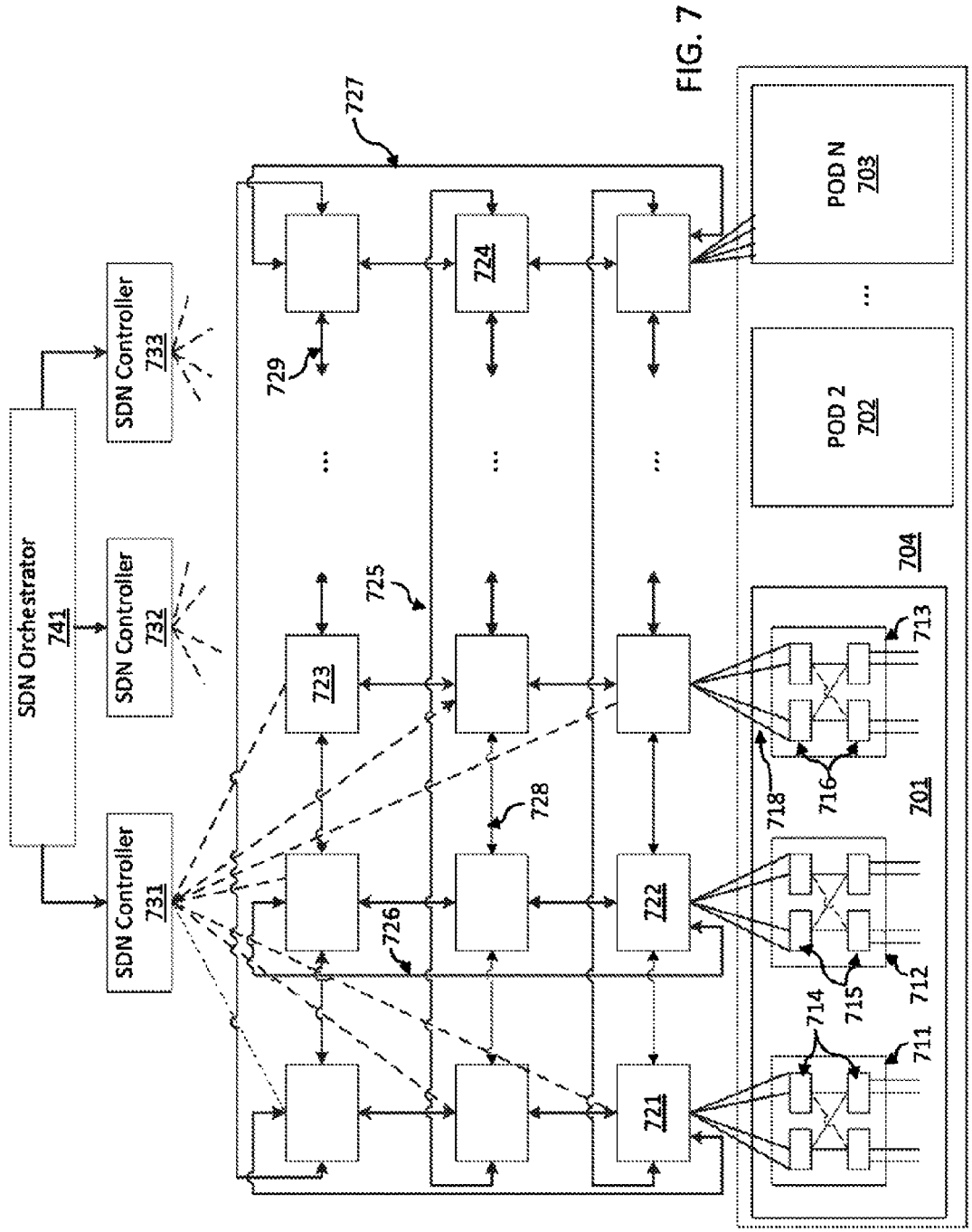
FIG. 7 is a block/flow diagram illustrating a system/method for data transport in a scalable hybrid data center network architecture in accordance with the present principles.

Referring now to FIG. 7, with continued reference to FIG. 2, a block/flow diagram illustrating a system/method for data transport in a scalable hybrid data center network architecture is illustratively depicted in accordance with the present principles. In one embodiment, the architecture may include a hybrid packet/circuit (or electrical/optical) data center network which may include one or more simpler Fat-Tree networks and one or more more complicated optical networks on top of the Fat-Tree.

In one embodiment, a 2-layer hybrid Fat-Tree 701 may be connected directly to the optical network on the top. To ensure connectivity and scalability, an all-optical network may be constructed in a more scalable fashion (e.g. in the topology of Torus network (2D, 3D, 4D, etc.)) For simplicity of illustration, the network shown in FIG. 7 is a 2D Torus, or Flattened Butterfly Network, but it is noted that the present principles may be applied to other network types according to various embodiments.

In one embodiment, in the case of a 2D Torus network, each optical 2-layer Fat-Tree 711, 712, 713 may be considered as one communication unit (e.g., node) that may add/drop traffic to the Torus network. The PODs 701, 702, 703 may be equivalent to the POD 210 in FIG. 2, and the optical switching fabric 714, 715, 716 may be equivalent to the optical part of the hybrid switch 211, 212. For illustrative purposes, the electrical part of the hybrid network has been omitted to make the topology clearer. The optical high-speed fiber links may be equivalent to the optical links 205. The optical cross-connect boxes 721, 722, 723, 724 may be employed as key components in the 2D Torus network according to the present principles, and will be discussed further hereinbelow.

In one embodiment, the optical links 725, 726, 728, 729 may be conventional WDM links that interconnect the neighboring optical cross-connect boxes. The SDN controllers 731, 732, 733 may be equivalent to the SDN controllers 241, 242, 243 in FIG. 2. However, SDN controllers 731, 732, 733 may also control the active components (e.g. the wavelength selective switch (WSS)) which may affect the establishment and tear-down of an optical channel in the hybrid DCN. The SDN orchestrator 741 may be equivalent to the SDN orchestrator 251, and may be responsible for orchestrating one or more multi-domain SDN networks within one data center or among different data centers.

It is noted that although the above network types and configurations are illustratively depicted according to the present principles, other network types and configurations are also contemplated, and may also be employed according to the present principles.

Figure 8:
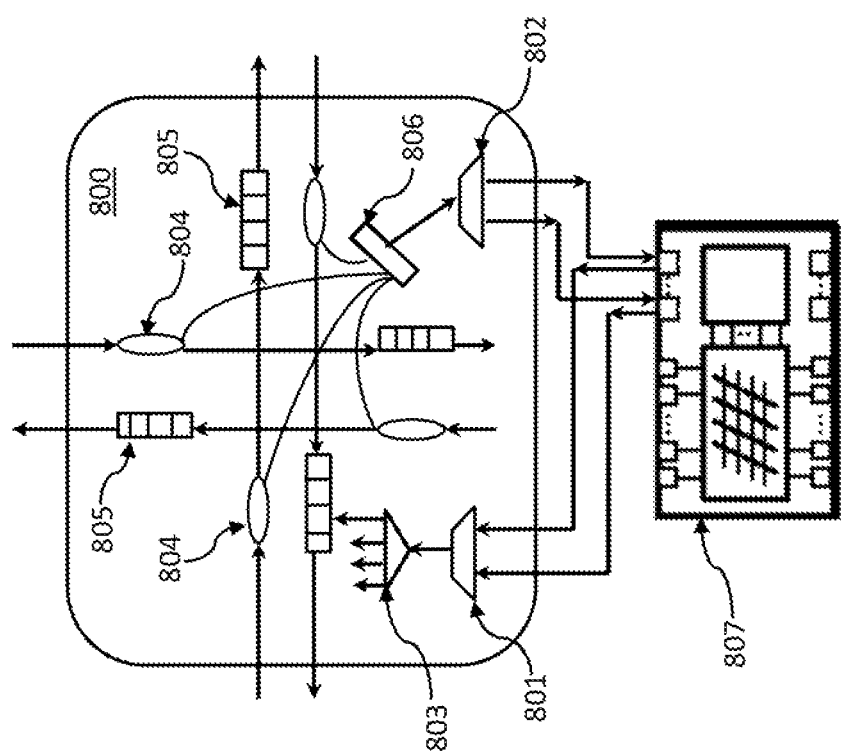
FIG. 8 is a block/flow diagram illustrating a system/method for data transport including an optical cross-connect box in accordance with the present principles.

Referring now to FIG. 8, with continued reference to FIGS. 6 and 7, a system/method for data transport including an optical cross-connect box is illustratively depicted in accordance with the present principles. In one embodiment, an optical 2D Cross-connect box 800 may be employed, and may be equivalent to the optical Cross-connect boxes 721, 722, 723, 724 depicted in FIG. 7. The box may include 4 directions (e.g., east, west, north, south) of WDM optical fibers, and each fiber may be equipped with one optical add/drop module. It is noted that the optical add/drop module may use any of the technologies according to the present principles (e.g., the optical add/drop modules illustrated in FIGS. 3, 4, 5, and 6).

To simplify the discussion, we just use the example which takes advantage of the technology 600 in in FIG. 6. In one embodiment, as illustrated in FIG. 8, each fiber may first tap off a portion of optical power through one or more splitters 804, and then may pass through the rest of the optical power to the FBG module 805 downstream. The WSS 806 may be shared among all the directions of the fibers, and the dropped optical signals from all the fibers may then be separated by one or more de-multiplexers (DEMUXs) 802. When adding the signals to a network (e.g., 2D Torus network), one or more multiplexers (MUXs) 801 may be employed to first group all the signals together, and then to broadcast the signals to all the directions of the fiber links by first splitting the signals using one or more splitters 803 (e.g., 1×4). The signals may then be connected to an add port 606 of the FBG module 805.

It is noted that although the above configurations are illustratively depicted according to the present principles, other sorts of configurations are also contemplated, and may also be employed according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for packet switching in a network, comprising:
   two or more hybrid packet and circuit switching network architectures configured to connect two or more core level switches in the network architectures, the network architectures being controlled and managed using a centralized software defined network (SDN) control plane;
   an optical ring network configured to interconnect the two or more hybrid network architectures;
   one or more hybrid electrical/optical packet and circuit switches configured to perform switching and traffic aggregation; and
   one or more high-speed optical interfaces and one or more low-speed hybrid electrical/optical interfaces configured to transmit data.

2. The system as recited in claim 1, wherein the hybrid network includes Fat-Tree and Torus network architectures.

3. The system as recited in claim 1, wherein the core level switches in the network architectures are connected using a Torus topology.

4. The system as recited in claim 1, wherein the hybrid switches include hybrid electrical/optical switching fabric, and the two fabric types are connected by a predetermined number of Optical/Electrical/Optical (O/E/O) interfaces,
   wherein the electrical switching fabric provides fast, packet granularity switching and/or aggregation capabilities and the optical switching fabric provides slower, circuit granularity switching and/or optical traffic grooming capabilities; and
   wherein interfaces between the electrical and optical switching fabrics enable conversion capabilities between the electrical (packet) domain and the optical (circuit) domain.

5. The system as recited in claim 1, wherein the hybrid switches are employed for rack to rack communications in the hybrid network.

6. The system as recited in claim 1, wherein scalability of the optical ring network is extended by employing sophisticated network topologies including 2D, 3D, or 4D Torus network topologies.

7. The system as recited in claim 1, further comprising switching facilities wherein legacy servers may be upgraded to super servers with no architectural upgrades to the switching facilities.

8. The system as recited in claim 1, wherein the software defined network (SDN) control plane includes one or more SDN controllers, and one or more SDN orchestrators.

9. The system as recited in claim 8, wherein the one or more SDN controllers are configured to control underlying active components, and the one or more SDN orchestrators are configured to orchestrate the one or more SDN controllers and determine network topology and resource information.

10. A method for packet switching in a network, comprising:
    connecting two or more core level switches in the network architectures using two or more hybrid packet and circuit switching network architectures, the network architectures being controlled and managed using a centralized software defined network (SDN) control plane;

interconnecting the two or more hybrid network architectures using an optical ring network;

performing switching and traffic aggregation using one or more hybrid electrical/optical packet and circuit switches; and transmitting data using one or more high-speed optical interfaces and one or more low-speed electrical/optical interfaces.

11. The method as recited in claim 10, wherein the hybrid network includes Fat-Tree and Torus network architectures.

12. The method as recited in claim 10, wherein the core level switches in the network architectures are connected using a Torus topology.

13. The method as recited in claim 10, wherein the hybrid switches include hybrid electrical/optical switching fabric, and the two fabric types are connected by a predetermined number of Optical/Electrical/Optical (O/E/O) interfaces, wherein the electrical switching fabric provides fast, packet granularity switching and/or aggregation capabilities and the optical switching fabric provides slower, circuit granularity switching and/or optical traffic grooming capabilities; and wherein interfaces between the electrical and optical switching fabrics enable conversion capabilities between the electrical (packet) domain and the optical (circuit) domain.

14. The method as recited in claim 10, wherein the hybrid switches are employed for rack to rack communications in the hybrid network.

15. The method as recited in claim 10, wherein scalability of the optical ring network is extended by employing sophisticated network topologies including 2D, 3D, or 4D Torus network topologies.

16. The method as recited in claim 10, further comprising switching facilities wherein legacy servers may be upgraded to super servers with no architectural upgrades to the switching facilities.

17. The method as recited in claim 10, wherein the software defined network (SDN) control plane includes one or more SDN controllers, and one or more SDN orchestrators.

18. The method as recited in claim 17, wherein the one or more SDN controllers are configured to control underlying active components, and the one or more SDN orchestrators are configured to orchestrate the one or more SDN controllers and determine network topology and resource information.

* * * * *